(12) United States Patent
Hosogi (10) Patent No.: US 9,061,272 B2
(45) Date of Patent: *Jun. 23, 2015

(54) TUNGSTEN OXIDE PHOTOCATALYST MODIFIED WITH COPPER ION, AND PROCESS FOR PRODUCTION THEREOF

(75) Inventor: Yasuhiro Hosogi, Toyama (JP)

(73) Assignee: SHOWA DENKO K.K., Tokyo (JP)

( * ) Notice: Subject to any disclaimer, the term of this patent is extended or adjusted under 35 U.S.C. 154(b) by 271 days.

This patent is subject to a terminal disclaimer.

(21) Appl. No.: 13/579,224

(22) PCT Filed: Feb. 15, 2011

(86) PCT No.: PCT/JP2011/053180
§ 371 (c)(1),
(2), (4) Date: Nov. 1, 2012

(87) PCT Pub. No.: WO2011/102353
PCT Pub. Date: Aug. 25, 2011

(65) Prior Publication Data
US 2013/0053238 A1    Feb. 28, 2013

(30) Foreign Application Priority Data
Feb. 16, 2010   (JP) .................................. 2010-031392

(51) Int. Cl.
*B01J 35/00*    (2006.01)
*B01J 23/888*   (2006.01)
(Continued)

(52) U.S. Cl.
CPC .............. *B01J 35/004* (2013.01); *B01J 23/888* (2013.01); *B01J 37/06* (2013.01); *B01J 35/1009* (2013.01);
(Continued)

(58) Field of Classification Search
CPC .... B01J 35/004; B01J 35/1009; B01J 23/888; B01J 37/06; B01J 2255/20761; B01J 2255/802; B01J 2255/20776
USPC ........................................ 423/593.1; 502/318
See application file for complete search history.

(56) References Cited

U.S. PATENT DOCUMENTS

2011/0005916 A1    1/2011   Hashimoto et al.

FOREIGN PATENT DOCUMENTS

CN      101224419 A     7/2008
EP        2072119 A1    6/2009
(Continued)

OTHER PUBLICATIONS

Chinese Office Action dated Sep. 24, 2013 for corresponding CN Application No. CN201180009794.2.
(Continued)

*Primary Examiner* — Anthony J Zimmer
(74) *Attorney, Agent, or Firm* — Sughrue Mion, PLLC (57) ABSTRACT

The present invention relates to a copper ion-modified tungsten oxide photocatalyst subjected to chemical etching treatment with a basic aqueous solution in which a rate of change in diffuse reflectance of the photocatalyst as measured at a wavelength of 700 nm between before and after irradiated with an ultraviolet light in atmospheric air is less than 10%; and a process for producing a copper ion-modified tungsten oxide photocatalyst which includes a copper ion modifying step of modifying a tungsten oxide powder with a copper ion; a chemical etching step of subjecting the tungsten oxide powder to chemical etching treatment with a basic aqueous solution, the chemical etching treatment being carried out either before or after the copper ion modifying step; and a drying step of drying the product obtained after the above steps at a temperature of 200° C. or lower.

9 Claims, 2 Drawing Sheets

(51) Int. Cl.
  *B01J 37/06* (2006.01)
  *B01J 35/10* (2006.01)
  *B01D 53/86* (2006.01)

(52) U.S. Cl.
  CPC ... *B01D 53/8668* (2013.01); *B01D 2255/20761* (2013.01); *B01D 2255/20776* (2013.01); *B01D 2255/802* (2013.01)

(56) References Cited

FOREIGN PATENT DOCUMENTS

| JP | 2000-279905 A | 10/2000 |
|---|---|---|
| JP | 2005-254042 A | 9/2005 |
| JP | 2008-149312 A | 7/2008 |
| JP | 2009-189952 A | 8/2009 |
| JP | 2009-226299 A | 10/2009 |
| JP | 2009-263180 A | 11/2009 |

OTHER PUBLICATIONS

Hiroshi Irie, et al; "Efficient visible light-sensitive photocatalysts: Grafting Cu(II) ions onto $TiO_2$ and $WO_3$ photocatalysts"; Chemical Physics Letters 457 (2008); pp. 202-205.

Arai et al: Promotion effect of CuO co-catalyst on WO3-catalyzed photodegradation of organic substances, Catalysis Communications, Nov. 21, 2007, pp. 1254-1258, vol. 9, No. 6, Amsterdam, NL.

Communication dated Mar. 23, 2015 from the European Patent Office in counterpart application No. 11744639.3.

TUNGSTEN OXIDE PHOTOCATALYST MODIFIED WITH COPPER ION, AND PROCESS FOR PRODUCTION THEREOF

TECHNICAL FIELD

The present invention relates to copper ion-modified tungsten oxide photocatalysts produced by chemical etching treatment of tungsten oxide which is capable of exhibiting a higher catalytic activity under irradiation with a visible light, and a process for producing the copper ion-modified tungsten oxide photocatalysts.

BACKGROUND ART

Titanium oxide is widely known as a photocatalyst, but has substantially no photocatalytic function when used in a place where no ultraviolet ray is present. Therefore, there have been made extensive researches concerning tungsten oxide.

As an attempt for allowing tungsten oxide to exhibit a visible light activity or improving the visible light activity, there has been proposed a catalyst obtained by supporting a co-catalyst on a surface of the tungsten oxide. For example, the platinum-supporting tungsten oxide catalyst is capable of exhibiting a photocatalytic activity under irradiation with a visible light (for example, refer to Patent Document 1). Also, the palladium-supporting tungsten oxide catalyst is capable of exhibiting a high catalytic activity to decomposition reaction of toluene (for example, refer to Patent Document 2). However, it is desirable that these noble metals are not used in view of rarity and expensiveness thereof. On the other hand, the tungsten oxide on which copper as a relatively inexpensive metal is supported in the form of a copper ion or copper oxide is capable of exhibiting a photocatalytic activity under irradiation with a visible light (for example, refer to Non-Patent Document 1 and Patent Document 3).

However, when the photocatalyst on which the co-catalyst is supported is used under irradiation with light, metal particles of the co-catalyst tend to be aggregated together, thereby causing discoloration of the photocatalyst as well as problems upon use such as deteriorated retention of properties, poor appearance or the like. As a result, any measures against these drawbacks must be taken.

On the other hand, for the purpose of enhancing an activity of the photocatalyst, the surface of the catalyst has been often subjected to etching treatment. For example, Patent Document 4 discloses the method in which the surface of the catalyst is subjected to photo-etching treatment by irradiation with an ultraviolet light to enhance a photocatalytic activity thereof. However, in this method, use of additional devices such as an ultraviolet generator is needed, and it is therefore difficult to synthesize a large amount of the catalyst, resulting in undesirable process.

Further, Patent Document 5 discloses the process for producing a photocatalyst in which fine particles of gold and/or a transition metal and/or a rare earth element are supported on a metal oxide, and the resulting material is treated with ammonia and then calcined. However, the photocatalyst obtained by the above process tends to suffer from discoloration and fails to exhibit a sufficient activity.

PRIOR DOCUMENTS

Patent Documents

Patent Document 1: JP-A 2009-160566
Patent Document 2: JP-A 2009-61426
Patent Document 3: JP-A 2008-149312
Patent Document 4: JP-A 2005-254042
Patent Document 5: JP-A 6-182205

Non-Patent Documents

Non-Patent Document 1: "Chemical Physics Letters", 457 (2008), 202-205, Hiroshi Irie, Shuhei Miura, Kazuhide Kamiya and Kazuhito Hashimoto

SUMMARY OF THE INVENTION

Problems to be Solved by the Invention

As described above, there is a demand for development of a catalyst having a high productivity, a high photocatalytic activity under irradiation with a visible light and a less discoloration. However, any effective catalysts have not been obtained until now.

The present invention has been accomplished in view of the above problems encountered in the art, and an object of the present invention is to provide a copper ion-modified tungsten oxide photocatalyst which has a less discoloration under use conditions thereof, and is capable of exhibiting a high productivity and a high catalytic activity under irradiation with a visible light, and a process for producing the copper ion-modified tungsten oxide photocatalyst.

Means for Solving the Problems

As a result of intensive and extensive researches for achieving the above object, the present inventors have found that when the tungsten oxide is subjected to chemical etching treatment with a basic aqueous solution and then to drying treatment upon production of a copper ion-modified tungsten oxide photocatalyst, the rate of change in diffuse reflectance of the resulting photocatalyst as measured in atmospheric air between before and after irradiated with an ultraviolet light becomes less than 10%, i.e., the photocatalyst can be enhanced in catalytic activity even under irradiation with a visible light as compared to conventional ones.

The present invention has been accomplished on the basis of this finding.

That is, the present invention relates to the following aspects.

[1] A copper ion-modified tungsten oxide photocatalyst subjected to chemical etching treatment with a basic aqueous solution, in which a rate of change in diffuse reflectance of the photocatalyst as measured at a wavelength of 700 nm between before and after irradiated with an ultraviolet light in atmospheric air is less than 10%.

[2] The copper ion-modified tungsten oxide photocatalyst as described in the above aspect [1], wherein the copper ion is derived from copper (II) chloride.

[3] The copper ion-modified tungsten oxide photocatalyst as described in the above aspect [1] or [2], wherein an amount of the copper ion used for modifying the tungsten oxide is from 0.01 to 0.06% by mass in terms of metallic copper.

[4] The copper ion-modified tungsten oxide photocatalyst as described in any one of the above aspects [1] to [3], wherein the photocatalyst obtained after the chemical etching treatment has a BET specific surface area of 9.0 $m^2/g$ or more.

[5] A process for producing a copper ion-modified tungsten oxide photocatalyst, including:
a copper ion modifying step of modifying a tungsten oxide powder with a copper ion;

a chemical etching step of subjecting the tungsten oxide powder to chemical etching treatment with a basic aqueous solution, the chemical etching treatment being carried out either before or after the copper ion modifying step; and a drying step of drying the product obtained after the above steps at a temperature of 200° C. or lower.

[6] The process for producing a copper ion-modified tungsten oxide photocatalyst as described in the above aspect [5], wherein the chemical etching step is carried out subsequent to the copper ion modifying step.

[7] The process for producing a copper ion-modified tungsten oxide photocatalyst as described in the above aspect [5] or [6], wherein the basic aqueous solution is an ammonia aqueous solution.

[8] The process for producing a copper ion-modified tungsten oxide photocatalyst as described in the above aspect [5] or [6], wherein the basic aqueous solution is a triethylamine aqueous solution.

[9] The process for producing a copper ion-modified tungsten oxide photocatalyst as described in any one of the above aspects [5] to [8], wherein the basic aqueous solution has a pH value of from 8.5 to 10.5.

Effect of the Invention

In accordance with the present invention, there are provided a tungsten oxide photocatalyst modified with a copper ion which has a less discoloration under use conditions thereof, and is capable of exhibiting a high productivity and a high catalytic activity under irradiation with a visible light (hereinafter occasionally referred to as a "copper ion-modified tungsten oxide photocatalyst"), and a process for producing the copper ion-modified tungsten oxide photocatalyst.

PREFERRED EMBODIMENTS FOR CARRYING OUT THE INVENTION

First, the copper ion-modified tungsten oxide photocatalyst according to the present invention is described.

The copper ion-modified tungsten oxide photocatalyst according to the present invention is a chemically etched copper ion-modified tungsten oxide photocatalyst subjected to chemical etching treatment with a basic aqueous solution, in which a rate of change in diffuse reflectance of the photocatalyst as measured in atmospheric air at a wavelength of 700 nm between before and after irradiated with an ultraviolet light is less than 10% (hereinafter occasionally referred to merely as an "etched copper ion-modified tungsten oxide photocatalyst").

Meanwhile, the term "photocatalyst" as used in the present specification means a catalyst having properties of a semiconductor in which holes and electrons as generated by absorbing light having a wavelength not smaller than a band gap thereof are consumed by chemical reaction therebetween.

In addition, in the present specification, the copper ion-modified tungsten oxide photocatalyst to be subjected to chemical etching treatment is also appropriately referred to merely as a "copper ion-modified tungsten oxide photocatalyst to be treated".

[Etched Copper Ion-Modified Tungsten Oxide Photocatalyst]
(Copper Ion-Modified Tungsten Oxide Photocatalyst to be Treated)

It is generally known that tungsten oxide ($WO_3$) is capable of absorbing light on a visible light side but usually exhibits an extremely low photocatalytic activity by itself. However, in recent years, as described in the above Patent Document 3, it has been found that tungsten oxide containing a copper compound as a catalytic activity accelerator is useful as a visible light-responsive photocatalyst material. In addition, in the above Non-Patent Document 1, it is described that a copper ion-supporting tungsten oxide is useful as a visible light-responsive photocatalyst material. That is, tungsten oxide modified with a copper ion becomes effective as a visible light-responsive photocatalyst material.

As the method of modifying tungsten oxide with a copper ion (copper ion-modifying step), there may be used, for example, the method in which the tungsten oxide powder is mixed with a solution prepared by adding a cupric salt (divalent copper salt) such as copper chloride, copper acetate, copper sulfate and copper nitrate and preferably copper (II) chloride to a polar solvent, and the resulting dispersion is subjected to drying treatment to support the copper ion on a surface of the tungsten oxide.

The amount of the copper ion with which the tungsten oxide is modified is preferably from 0.01 to 0.06% by mass, more preferably from 0.02 to 0.06% by mass and most preferably from 0.02 to 0.04% by mass in terms of metallic copper (Cu) on the basis of the tungsten oxide.

When the amount of the copper ion used for modifying the tungsten oxide is 0.01% by mass or more, the resulting photocatalyst can exhibit a good photocatalytic performance. When the amount of the copper ion used for modifying the tungsten oxide is 0.06% by mass or less, the copper ion tends to be hardly aggregated, so that the resulting photocatalyst can be prevented from suffering from deterioration in its photocatalytic performance.

Meanwhile, the above tungsten oxide powder might also contain impurities such as iron and molybdenum respectively in an amount of about 0.001% by mass. In the present invention, there may also be used such a tungsten oxide powder.

(Chemical Etching Treatment)

In the present invention, the thus obtained copper ion-modified tungsten oxide photocatalyst to be treated is subjected to chemical etching treatment with a basic aqueous solution.

The "etching treatment" as used in the present specification means the treatment in which at least a part of a surface of the photocatalyst is dissolved and removed. The above dissolving and removing treatment includes local removal of an atomic level. More specifically, fine recesses, irregularities or cut portions may be formed on the surface of the photocatalyst. In the present invention, such an etched region may be formed on at least a part of the surface of the photocatalyst, and it is not required that an entire surface of the photocatalyst is subjected to the dissolving and removing treatment. With the etching treatment, a specific surface area of the photocatalyst is increased, and a fresh active surface thereof is exposed to outside, so that the photocatalyst is enhanced in photocatalytic activity.

The progress of the etching treatment may be confirmed by a nitrogen adsorption specific surface area as measured by a BET method (BET specific surface area) of the tungsten oxide after being subjected to the etching treatment. More specifically, in the case where the BET specific surface area of the tungsten oxide obtained after the etching treatment is increased even by a slight amount as compared to that before the etching treatment, the progress of the etching treatment can be confirmed. The rate of increase in specific surface area of the tungsten oxide is preferably from 1 to 35%, more preferably from 1 to 15%, still more preferably from 2 to 15% and most preferably from 2 to 7%.

When the rate of increase in specific surface area of the tungsten oxide is 1% or more, the obtained photocatalyst is improved in adsorption performance for a reaction substrate and therefore suitably enhanced in photocatalytic performance. On the other hand, when the etching treatment is conducted until the rate of increase in specific surface area of the tungsten oxide exceeds 35%, a recovery rate of the tungsten oxide tends to be considerably reduced.

Also, the BET specific surface area of the tungsten oxide after subjected to the etching treatment is preferably 9.0 m²/g or more, and more preferably 9.5 m²/g or more. When the BET specific surface area of the tungsten oxide after subjected to the etching treatment is 9.0 m²/g or more, the probability of recombination of electrons and holes produced in the tungsten oxide by irradiation with light is reduced, so that the resulting photocatalyst can be enhanced in photocatalytic activity.

In addition, the progress of the etching treatment may also be confirmed by observation using an electron microscope. In this case, the progress of the etching treatment may be confirmed by the presence of irregularities having a variation in height of 20 nm or less which are not observed before subjected to the etching treatment, on a surface of the respective catalyst particles.

The formation of the irregularities on the catalyst means increase in number of active sites owing to exposure of fresh lattice planes and therefore enhancement in photocatalytic activity of the resulting photocatalyst.

Meanwhile, the details of the etching treatment with a basic aqueous solution are explained later with respect to the process for producing the copper ion-modified tungsten oxide photocatalyst.

(Properties of Etched Copper Ion-Modified Tungsten Oxide Photocatalyst)

As described above, in the present invention, it is required that a rate of change in diffuse reflectance of the copper ion-modified tungsten oxide photocatalyst subjected to the chemical etching treatment as measured at a wavelength of 700 nm between before and after irradiated with an ultraviolet light in atmospheric air is less than 10%. When the rate of change in diffuse reflectance of the photocatalyst is not less than 10%, the resulting photocatalyst may fail to exhibit the effect of enhancing a catalytic activity thereof by the chemical etching treatment to a sufficient extent. From the viewpoint of a high effect of enhancing a catalytic activity of the photocatalyst, the rate of change in diffuse reflectance of the photocatalyst is preferably 6% or less and more preferably 3% or less.

Meanwhile, the above rate of change in diffuse reflectance of the photocatalyst is the value calculated according to the following formula (1).

$$Y(\%)=[(A-B)/A]\times 100 \quad (1)$$

wherein A (%) represents a diffuse reflectance before irradiated with an ultraviolet light; B (%) represents a diffuse reflectance after irradiated with an ultraviolet light; and Y (%) represents a rate of change in diffuse reflectance.

The conditions of irradiation with an ultraviolet light and the method of measuring the diffuse reflectance are described below.

<Conditions of Irradiation with Ultraviolet Light>

Three grams of a copper ion-modified tungsten oxide photocatalyst powder subjected to the etching treatment or subjected to no etching treatment were placed in a petri dish having a bottom surface area of 36 cm², and flattened by pushing a bottom of a bottle thereon (into a thickness of about 3 mm). Then, the photocatalyst powder in the petri dish was irradiated with an ultraviolet light with a central wavelength of 365 nm and an illumination intensity of 1 mW/cm² for 72 h in atmospheric air using a black light as a light source. The illumination intensity may be measured by a lux meter "LX-1332" available from Custom Corp.

<Measurement of Diffuse Reflectance>

The copper ion-modified tungsten oxide photocatalyst powder subjected to the etching treatment or subjected to no etching treatment before and after irradiated with an ultraviolet light is subjected to measurement of a diffuse reflectance thereof at a wavelength of 700 nm using a spectrophotometer.

Upon the above measurement, when the rate of change in diffuse reflectance of the catalyst as measured at a wavelength of 700 nm is less than 10%, the resulting photocatalyst has no sensitivity to light. The rate of change in diffuse reflectance of the catalyst is preferably 6% or less because such a catalyst suffers from no change in color tone thereof. The occurrence of change in color tone of the catalyst tends to cause undesirable change or damage to a beauty when the catalyst is applied to members such as wall papers.

The light sensitivity of the catalyst tends to not only cause a change in color of the catalyst itself, but also further induce a change in conditions of the copper ion supported thereon. Further, the change in conditions of the copper ion supported on the catalyst tends to undesirably cause deterioration in catalytic performance thereof.

Although the effects of the etching treatment are not clearly known, the following mechanism is described in Patent Document 4.

That is, by subjecting only a part of the surface of the catalyst to the etching treatment, etc., to render an energy band of the photocatalyst particles unsymmetrical, it is possible to considerably enhance a photoreaction efficiency of the catalyst.

For the same reason as described above, it is considered that the copper ion-modified tungsten oxide according to the present invention can also be enhanced in photoreaction efficiency by the etching treatment.

Further, it is suggested that the irregular structure on the surface of the catalyst serves for suppressing diffusion and aggregation of the copper ion owing to an external energy such as light energy and imparting a non-light sensitivity thereto.

[Process for Producing Copper Ion-Modified Tungsten Oxide Photocatalyst]

The process for producing the copper ion-modified tungsten oxide photocatalyst according to the present invention, includes a copper ion modifying step of modifying a tungsten oxide powder with a copper ion; a chemical etching step of subjecting the tungsten oxide powder to chemical etching treatment with a basic aqueous solution, the chemical etching treatment being carried out either before or after the copper ion modifying step; and a drying step of drying the product obtained after the above steps at a temperature of 200° C. or lower.

In the following, the respective steps of the above process are explained.

(Copper Ion Modifying Step)

The copper ion modifying step of modifying a tungsten oxide powder with a copper ion is the same as explained above with respect to the copper ion-modified tungsten oxide photocatalyst to be treated.

(Chemical Etching Step)

Examples of the basic aqueous solution used as an etching agent in the chemical etching step include a sodium hydroxide aqueous solution, a potassium hydroxide aqueous solution, a calcium hydroxide aqueous solution, lime water, a sodium carbonate aqueous solution, an ammonia aqueous solution, a triethylamine aqueous solution, a pyridine aqueous solution, an ethylenediamine aqueous solution and a sodium hydrogen carbonate aqueous solution. Among these basic aqueous solutions, in view of facilitated removal of contaminants causing deterioration in catalytic activity, preferred are an ammonia aqueous solution and a triethylamine aqueous solution.

From the viewpoint of attaining a good catalytic activity, the pH value of the basic aqueous solution is preferably from 8.5 to 10.5 and more preferably from 9.2 to 10.5. When the pH value of the basic aqueous solution is adjusted to 8.5 or more, it is possible to etch the surface of the tungsten oxide in a more efficient manner.

Meanwhile, when the pH value of the basic aqueous solution is more than 10.5, the amount of the tungsten oxide dissolved therein tends to be increased, so that the amount of the tungsten oxide recovered tends to be considerably reduced.

The pH value of the basic aqueous solution may be adjusted to a desired value by controlling a concentration of an alkali component used therein (the above-mentioned alkali component such as ammonia, sodium hydroxide and triethylamine).

The etching treatment with the etching agent may be carried out either before or after modified with a copper ion, and is preferably carried out after modified with a copper ion. When carrying out the etching treatment after completion of the copper ion-modifying step, the copper ion supported on the tungsten oxide acts as a masking agent so that formation of an irregular structure on the surface of the tungsten oxide is facilitated. Further, even when the etching treatment is carried out before modified with a copper ion, the specific surface area of the tungsten oxide is increased, so that the resulting photocatalyst can be enhanced in photocatalytic activity.

The etching treatment time is preferably 1 h or longer. When the etching treatment is carried out for 1 h or longer, it is possible to uniformly etch the tungsten oxide. The etched portions of the tungsten oxide show striped patterns each having a width of 20 nm or less as observed by SEM (refer to FIG. 1 for Example 1). In addition, the etched tungsten oxide has an increased BET specific surface area and therefore is improved in performance as a photocatalyst.

(Drying Step)

After being subjected to the above copper ion-modifying step and chemical etching step, the resulting photocatalyst is dried at a temperature of 200° C. or lower. When the drying temperature is higher than 200° C., the catalyst obtained after the chemical etching step tends to suffer from undesirable change in surface conditions thereof, resulting in deterioration in photocatalytic activity of the resulting photocatalyst. The drying temperature is preferably 180° C. or lower and more preferably 150° C. or lower.

The thus produced copper ion-modified tungsten oxide photocatalyst according to the present invention may be used in various configurations. The copper ion-modified tungsten oxide photocatalyst is preferably used in the form of a powder.

The photocatalyst of the present invention may exhibit its photocatalytic performance even when irradiated with light having a wavelength of less than 420 nm, and further can exhibit a higher photocatalytic performance when irradiated with a visible light having a wavelength of 420 nm or more.

The photocatalytic performance of the photocatalyst according to the present invention may include various functions such as antibacterial activity, antivirus activity, deodorizing effect, anti-fouling effect, and environmental purification such as atmospheric air purification and water purification. Specific examples include the below-mentioned functions although not particularly limited thereto.

In particular, in the case where the photocatalyst is present in the reaction system together with substances that give adverse influences on environments such as organic compounds including aldehydes, there may be observed the effects of reducing a concentration of the organic substances and increasing a concentration of carbon dioxide as an oxidation-decomposed product thereof under irradiation with light as compared to the case where the photocatalyst is placed in a dark place.

EXAMPLES

The present invention will be described in more detail below with reference to the following examples. However, these examples are only illustrative and not intended to limit the invention thereto.

Incidentally, various properties of the photocatalyst powders obtained in the respective Examples and Comparative Examples were determined by the following methods.

(1) Diffuse Reflectance and Rate of Change in Diffuse Reflectance Before and After Irradiated with Ultraviolet Light (UV):

According to the method described in the present specification, using a black light "FL20S BL" (product name) available from Hitachi Limited, and an integrating sphere spectrophotometer "UV-2400PC" (product name) available from Shimadzu Corp., a diffuse reflectance of the photocatalyst powder was measured at a wavelength of 700 nm before and after irradiated with ultraviolet light having a central wavelength of 365 nm for 72 h in atmospheric air, and a rate of change in the diffuse reflectance therebetween was calculated.

(2) Rate of Generation of Carbon Dioxide

A glass petri dish having a diameter of 1.5 cm was placed in a closed glass reaction container (capacity: 0.5 L), and 0.3 g of each of the photocatalyst powders obtained in the respective Examples and Comparative Examples was placed on the petri dish. The inside atmosphere of the reaction container was replaced with a mixed gas containing oxygen and nitrogen at a volume ratio of 1:4, and 5.2 µL of water (corresponding to a relative humidity of 50% (at 25° C.)) and 5.0 mL of 5.1% acetaldehyde (a mixed gas with nitrogen; normal condition; 25° C., 1 atm) were enclosed and sealed in the reaction container and irradiated with a visible light from outside of the reaction container. The irradiation with a visible light was carried out using a xenon lamp fitted with a UV-cut filter for cutting an ultraviolet light having a wavelength of 400 nm or less ("L-42" (tradename) available from Asahi Techno Glass Co., Ltd.) as a light source. The rate of generation of carbon dioxide as an oxidation-decomposed product of the acetaldehyde was measured with time by gas chromatography.

Example 1

Five hundred grams of a tungsten oxide powder were added to 4 L of a copper chloride aqueous solution (corresponding to 0.1% by mass in terms of copper based on tungsten oxide). While stirring, the resulting dispersion was heat-treated at 90° C. for 1 h, and then subjected to suction filtration to wash and recover solids therefrom. The thus recovered solids were dried at 120° C. over whole day and night and then pulverized in an agate mortar to obtain a tungsten oxide powder which was modified with 0.04% by mass of Cu. Twenty grams of the tungsten oxide powder thus modified with 0.04% by mass of a copper ion were suspended in 100 mL of aqueous ammonia having a pH value of 10.1, and the resulting suspension was stirred for 24 h. Upon the stirring, ammonia was added dropwise to the suspension after the elapse of 2 h and 3 h from initiation of the stirring to adjust again a pH value of the suspension to 8.9. After completion of the treatment, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched copper ion-modified tungsten oxide photocatalyst powder according to the present invention (BET specific surface area: 10.0 m$^2$/g).

Figure 1:
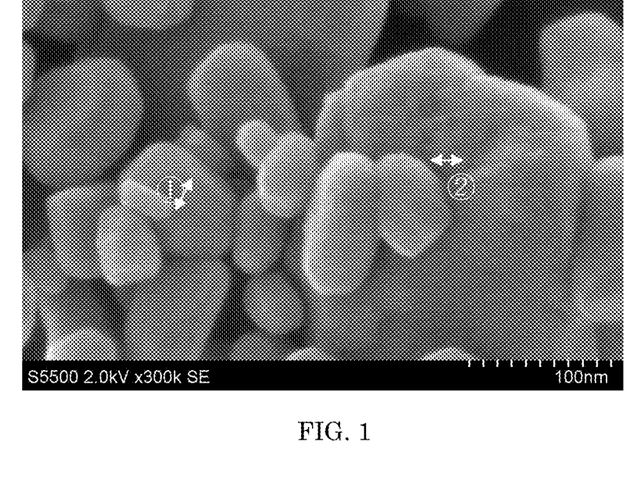
FIG. 1 is an electron micrograph of a copper ion-modified tungsten oxide photocatalyst obtained in Example 1.
Figure 3:
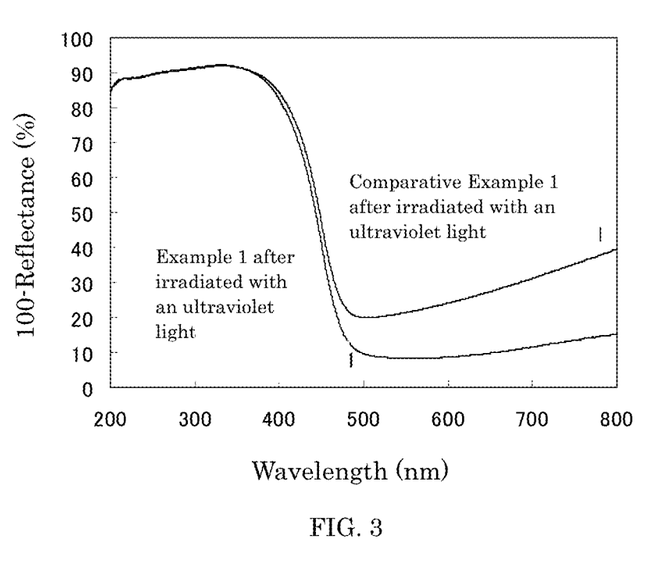
FIG. 3 is a view showing diffuse reflectance spectra of the copper ion-modified tungsten oxide photocatalyst obtained in Example 1 and the copper ion-modified tungsten oxide photocatalyst obtained in Comparative Example 1 after being irradiated with an ultraviolet light.

FIG. 1 shows an electron micrograph of the etched copper ion-modified tungsten oxide photocatalyst, and FIG. 3 shows a diffuse reflectance spectrum of the etched copper ion-modified tungsten oxide photocatalyst obtained after being irradiated with an ultraviolet light.

In FIG. 1, five steps are observed in the portion indicated by the encircled numeral 1 inserted in the drawing, whereas fine irregularities are observed in the portion indicated by the encircled numeral 2.

Example 2

Ten grams of the 0.04% by mass copper ion-modified tungsten oxide powder obtained in Example 1 were suspended in 100 mL of aqueous ammonia having a pH value of 9.5, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched copper ion-modified tungsten oxide photocatalyst powder according to the present invention (BET specific surface area: 9.5 m$^2$/g).

Example 3

Ten grams of the 0.04% by mass copper ion-modified tungsten oxide powder obtained in Example 1 were suspended in 100 mL of aqueous ammonia having a pH value of 9.8, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched copper ion-modified tungsten oxide photocatalyst powder according to the present invention (BET specific surface area: 10.3 m$^2$/g).

Example 4

Ten grams of the 0.04% by mass copper ion-modified tungsten oxide powder obtained in Example 1 were suspended in 100 mL of aqueous ammonia having a pH value of 8.7, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched copper ion-modified tungsten oxide photocatalyst powder according to the present invention (BET specific surface area: 9.3 m$^2$/g).

Example 5

Ten grams of the 0.04% by mass copper ion-modified tungsten oxide powder obtained in Example 1 were suspended in 100 mL of aqueous ammonia having a pH value of 9.2, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched copper ion-modified tungsten oxide photocatalyst powder according to the present invention (BET specific surface area: 9.4 m$^2$/g).

Example 6

Ten grams of the 0.04% by mass copper ion-modified tungsten oxide powder obtained in Example 1 were suspended in 100 mL of aqueous ammonia having a pH value of 10.5, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched copper ion-modified tungsten oxide photocatalyst powder according to the present invention (BET specific surface area: 9.7 m$^2$/g).

Example 7

Ten grams of the 0.04% by mass copper ion-modified tungsten oxide powder obtained in Example 1 were suspended in 100 mL of aqueous ammonia having a pH value of 10.8, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched copper ion-modified tungsten oxide photocatalyst powder according to the present invention (BET specific surface area: 10.6 m$^2$/g).

Example 8

Ten grams of tungsten oxide were suspended in 100 mL of aqueous ammonia having a pH value of 9.5, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched tungsten oxide powder. Three grams of the thus obtained tungsten oxide powder were added to 30 mL of a copper chloride aqueous solution (amount of copper chloride charged: corresponding to 0.1% by mass in terms of copper on the basis of $WO_3$). Next, the resulting mixture was heat-treated at 90° C. for 1 h while stirring, and then allowed to stand for being cooled to room temperature, and further subjected to centrifugal separation to wash and recover the powder. The thus recovered powder was dried at 120° C. over whole day and night and then pulverized in an agate mortar to thereby obtain a chemically etched copper ion-modified tungsten oxide photocatalyst powder according to the present invention (BET specific surface area: 11.9 $m^2$/g).

Example 9

Ten grams of the 0.04% by mass copper ion-modified tungsten oxide powder obtained in Example 1 were suspended in 100 mL of a sodium hydroxide aqueous solution having a pH value of 9.5, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched copper ion-modified tungsten oxide photocatalyst powder according to the present invention (BET specific surface area: 10.0 $m^2$/g).

Example 10

Five hundred grams of a tungsten oxide powder were added to 4 L of a copper chloride aqueous solution (amount of copper chloride added: corresponding to 0.1% by mass in terms of copper on the basis of tungsten oxide). Next, the resulting mixture was heat-treated at 90° C. for 1 h while stirring, and then subjected to suction filtration to wash and recover the powder. The thus recovered powder was dried at 120° C. over whole day and night and then pulverized in an agate mortar to thereby obtain a tungsten oxide powder modified with 0.04% by mass of Cu. Ten grams of the tungsten oxide powder thus modified with 0.04% by mass of a copper ion were suspended in 100 mL of a triethylamine aqueous solution having a pH value of 10.5, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched copper ion-modified tungsten oxide photocatalyst powder according to the present invention (BET specific surface area: 9.8 $m^2$/g).

Example 11

Ten grams of the 0.04% by mass copper ion-modified tungsten oxide powder obtained in Example 10 were suspended in 100 mL of a triethylamine aqueous solution having a pH value of 9.5, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a chemically etched copper ion-modified tungsten oxide photocatalyst powder according to the present invention (BET specific surface area: 9.6 $m^2$/g).

Comparative Example 1

The 0.04% by mass copper ion-modified tungsten oxide photocatalyst powder obtained in Example 1 before being treated with the basic aqueous solution (BET specific surface area: 9.1 $m^2$/g) was used as a copper ion-modified tungsten oxide photocatalyst powder of Comparative Example 1.

Figure 2:
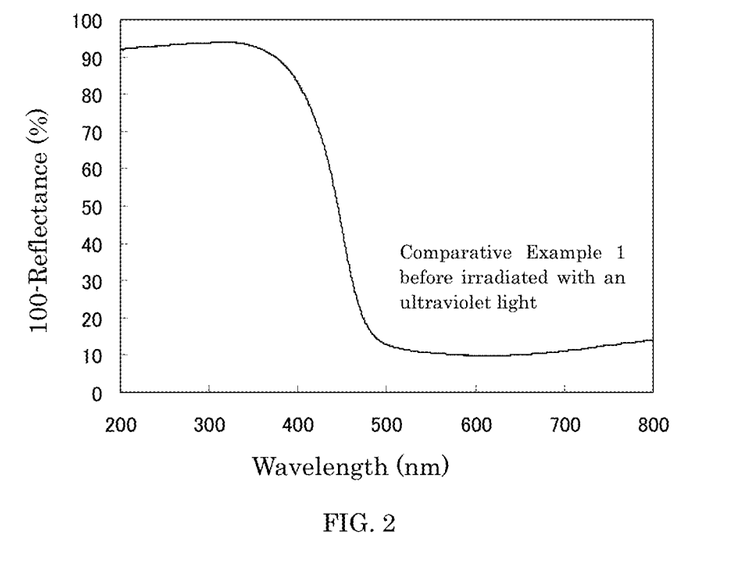
FIG. 2 is a view showing a diffuse reflectance spectrum of a copper ion-modified tungsten oxide photocatalyst obtained in Comparative Example 1.

FIG. 2 shows a diffuse reflectance spectrum of the copper ion-modified tungsten oxide photocatalyst, and FIG. 3 shows a diffuse reflectance spectrum of the copper ion-modified tungsten oxide photocatalyst obtained after being irradiated with an ultraviolet light.

Comparative Example 2

The 0.04% by mass copper ion-modified tungsten oxide powder obtained in Example 1 was charged into a 0.05 mol/L sulfuric acid aqueous solution. The resulting suspension was irradiated with a visible light from above while stirring to thereby subject the powder to photo-etching. Then, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain a photo-etched copper ion-modified tungsten oxide photocatalyst powder (BET specific surface area: 9.1 $m^2$/g).

Comparative Example 3

The 0.04% by mass copper ion-modified tungsten oxide powder obtained in Example 1 was suspended in 100 mL of a hydrochloric acid aqueous solution having a pH value of 2.7, and the resulting suspension was stirred for 24 h. After the stirring, the suspension was subjected to centrifugal separation to wash and recover the powder. The thus recovered powder was dried at 120° C. over whole day and night and then allowed to stand for being cooled to room temperature, and thereafter pulverized in an agate mortar to thereby obtain an acid-etched copper ion-modified tungsten oxide photocatalyst powder (BET specific surface area: 9.1 $m^2$/g).

Comparative Example 4

The chemically etched copper ion-modified tungsten oxide photocatalyst powder obtained in Example 2 was calcined at 500° C. for 2 h and then allowed to stand for being cooled to room temperature, and thereafter pulverized in an agate mortar to thereby obtain an annealed copper ion-modified tungsten oxide photocatalyst powder (BET specific surface area: 8.3 $m^2$/g).

Various properties of the photocatalyst powders obtained in Examples 1 to 11 and Comparative Examples 1 to 4 are shown together with kinds and pH values of the etching treatment agents used therein in Table 1.

TABLE 1

| | Etching treatment agent | | BET specific surface area | Properties of photocatalyst powder | | | Rate of generation of carbon dioxide (ppm by volume/h) |
| --- | --- | --- | --- | --- | --- | --- | --- |
| | | | | Diffuse reflectance before irradiation with UV | Diffuse reflectance after irradiation with UV | Rate of change in diffuse reflectance | |
| | Kind | pH | ($m^2/g$) | [A] (%) | [B] (%) | [(A − B)/A] × 100 (%) | |
| Example 1 | $NH_3$ aqueous solution | 10.1 | 10.0 | 89 | 89 | 0 | 223 |
| Example 2 | $NH_3$ aqueous solution | 9.5 | 9.5 | 89 | 89 | 0 | 232 |
| Example 3 | $NH_3$ aqueous solution | 9.8 | 10.3 | 89 | 89 | 0 | 227 |
| Example 4 | $NH_3$ aqueous solution | 8.7 | 9.3 | 89 | 87 | 0 | 165 |
| Example 5 | $NH_3$ aqueous solution | 9.2 | 9.4 | 89 | 84 | 6 | 167 |
| Example 6 | $NH_3$ aqueous solution | 10.5 | 9.7 | 89 | 85 | 5 | 192 |
| Example 7 | $NH_3$ aqueous solution | 10.8 | 10.6 | 89 | 84 | 6 | 159 |
| Example 8 | $NH_3$ aqueous solution | 9.5 | 11.9 | 89 | 86 | 3 | 207 |
| Example 9 | NaOH aqueous solution | 9.5 | 10.0 | 89 | 86 | 3 | 160 |
| Example 10 | Triethylamine aqueous solution | 10.5 | 9.8 | 89 | 88 | 0 | 184 |
| Example 11 | Triethylamine aqueous solution | 9.5 | 9.6 | 89 | 88 | 0 | 166 |
| Comparative Example 1 | — | | 9.1 | 89 | 69 | 22 | 156 |
| Comparative Example 2 | Photo-etching treatment | | 9.1 | 85 | 79 | 8 | 130 |
| Comparative Example 3 | HCl aqueous solution | 2.7 | 9.1 | 89 | 89 | 0 | 128 |
| Comparative Example 4 | $NH_3$ aqueous solution | 9.5 | 8.3 | 92 | 82 | 11 | 124 |

From the above results, it was confirmed that the copper ion-modified tungsten oxide photocatalysts according to the present invention were capable of generating carbon dioxide at a high rate which was about 1.5 times in maximum that of the copper ion-modified tungsten oxide photocatalyst subjected to no chemical etching treatment (Comparative Example 1) and therefore apparently improved in photocatalytic activity. The samples treated with the chemical etching agent having a pH value of less than 9.5 were enhanced in photocatalytic activity as the pH value was increased. When the pH value of the etching agent was more than 9.8, the photocatalytic activity of the photocatalyst treated therewith was deteriorated. When using the etching agent having a pH value of 9.8 or less, the etched portions were increased, so that the resulting photocatalyst was enhanced in photocatalytic activity. However, when using the etching agent having a pH value of more than 9.8, the etched surface was amorphized, so that the resulting photocatalyst exhibited such a tendency that a photocatalytic activity thereof was decreased.

In addition, it was confirmed that the etching treatments used in Comparative Examples 2 and 3 were more deteriorated in photocatalytic activity than that used in Comparative Example 1. From the above result, it was recognized that the simple etching treatment failed to attain a good surface condition of the photocatalyst which allowed the photocatalyst to exhibit a high catalytic activity. It is considered that in Comparative Example 4, the high-temperature annealing treatment caused change in surface condition of the catalyst, i.e., the rate of change in diffuse reflectance of the catalyst was increased, so that a catalytic activity thereof was also deteriorated.

The copper ion-modified tungsten oxide suffers from sensitization with light owing to diffusion or aggregation of the copper ion on a surface of the catalyst as well as reduction reaction thereof by light energy. As shown in FIG. 2, the copper ion-modified tungsten oxide of Comparative Example 1 before being irradiated with an ultraviolet light had a diffuse reflectance of 89% as measured at a wavelength of 700 nm, and exhibited a clear yellow color tone. On the other hand, as shown in FIG. 3, the copper ion-modified tungsten oxide of Comparative Example 1 as a sample after being irradiated with an ultraviolet light had a diffuse reflectance of 69% as measured at a wavelength of 700 nm, and exhibited a color tone near a green color. It is expected that the chemical etching treatment causes the effect of suppressing occurrence of diffusion and aggregation of the copper ion owing to change in surface condition of the catalyst, and imparts a non-light sensitivity to the catalyst. From FIG. 3, it was confirmed that the sample of Example 1 had a diffuse reflectance of 89% as measured at a wavelength of 700 nm even after being irradiated with an ultraviolet light, i.e., was free from change in diffuse reflectance as compared to that before being irradiated with the light, and therefore well imparted with a good non-light sensitivity. With respect to an actual color tone, the sample of Example 1 exhibited a yellow color derived from tungsten oxide, whereas the sample of Comparative Example 1 exhibited a green color.

From the above results, it was confirmed that the copper ion-modified tungsten oxide photocatalyst according to the present invention has a less discoloration under use conditions thereof, and is capable of exhibiting a high productivity and a high catalytic activity under irradiation with a visible light.

INDUSTRIAL APPLICABILITY

The copper ion-modified tungsten oxide photocatalyst according to the present invention is a chemically etched copper ion-modified tungsten oxide photocatalyst capable of exhibiting a higher photocatalytic activity under irradiation with a visible light, and is usefully used in various applications such as antibacterial treatments, antivirus treatments, deodorizing treatments, atmospheric air purification and water purification.

The invention claimed is:

1. A copper ion-modified tungsten oxide photocatalyst subjected to chemical etching treatment with a basic aqueous solution in which a rate of change in diffuse reflectivity of the photocatalyst as measured at a wavelength of 700 nm after irradiation with an ultraviolet light with a central wavelength of 365 nm at an illumination intensity of 1 mW/cm$^2$ for 72 hours in atmospheric air is less than 10%.

2. The copper ion-modified tungsten oxide photocatalyst according to claim 1, wherein the copper ion is derived from copper (II) chloride.

3. The copper ion-modified tungsten oxide photocatalyst according to claim 1, wherein an amount of the copper ion used for modifying the tungsten oxide is from 0.01 to 0.06% by mass in terms of metallic copper.

4. The copper ion-modified tungsten oxide photocatalyst according to claim 1, wherein the photocatalyst obtained after the chemical etching treatment has a BET specific surface area of 9.0 m$^2$/g or more.

5. A process for producing the copper ion-modified tungsten oxide photocatalyst as claimed in claim 1, comprising:
a copper ion modifying step of modifying a tungsten oxide powder with a copper ion;
a chemical etching step of subjecting the tungsten oxide powder to chemical etching treatment with a basic aqueous solution, the chemical etching treatment being carried out either before or after the copper ion modifying step; and
a drying step of drying the product obtained after the above steps at a temperature of 200° C. or lower.

6. The process for producing the copper ion-modified tungsten oxide photocatalyst according to claim 5, wherein the chemical etching step is carried out subsequent to the copper ion modifying step.

7. The process for producing the copper ion-modified tungsten oxide photocatalyst according to claim 5, wherein the basic aqueous solution is an ammonia aqueous solution.

8. The process for producing the copper ion-modified tungsten oxide photocatalyst according to claim 5, wherein the basic aqueous solution is a triethylamine aqueous solution.

9. The process for producing the copper ion-modified tungsten oxide photocatalyst according to claim 5, wherein the basic aqueous solution has a pH value of from 8.5 to 10.5.

* * * * *